Aug. 25, 1925.

R. T. POLLOCK 1,551,052

APPARATUS FOR FORMING ROOFING SHINGLES

Original Filed Dec. 15, 1919

Witness,
S. S. Mann

Inventor,
Robert T. Pollock
By Frank L. Belknap Atty.

Patented Aug. 25, 1925.

1,551,052

UNITED STATES PATENT OFFICE.

ROBERT T. POLLOCK, OF BOSTON, MASSACHUSETTS, ASSIGNOR TO FLINTKOTE COMPANY, OF BOSTON, MASSACHUSETTS, A CORPORATION OF MASSACHUSETTS.

APPARATUS FOR FORMING ROOFING SHINGLES.

Application filed December 15, 1919, Serial No. 344,965. Renewed March 18, 1925.

*To all whom it may concern:*

Be it known that I, ROBERT T. POLLOCK, a citizen of the United States, residing in the city of Boston, county of Suffolk, and Commonwealth of Massachusetts, have invented certain new and useful Improvements in Apparatus for Forming Roofing Shingles, of which the following is a specification.

My invention relates to improvements in an apparatus for forming roofing shingles and refers more particularly to an apparatus for slotting strips of asphaltic or bituminous coated felt to have the appearance of shingles when laid upon the roof.

Among the salient objects are to provide an apparatus for cutting slots in roofing material such as felt material that has been saturated or impregnated with bituminous or asphaltic substance and may or may not be granular surfaced, then cut into suitable shingle strips; to provide an apparatus adapted to cut a plurality of slots in a number of the roofing strips simultaneously; to provide an apparatus adapted to cut the material from the strips so that the slots have clean edges, greatly improving the appearance of the roof when the strips are laid; to provide an apparatus which cuts the slots in the roofing strips in a uniform manner and an apparatus which will cut any type of shingle strips, whether it is fresh from the coating and surfacing process or is in a dry hardened state; to provide an apparatus which is simple to operate and in general to provide a machine of the character referred to.

Figure 1:
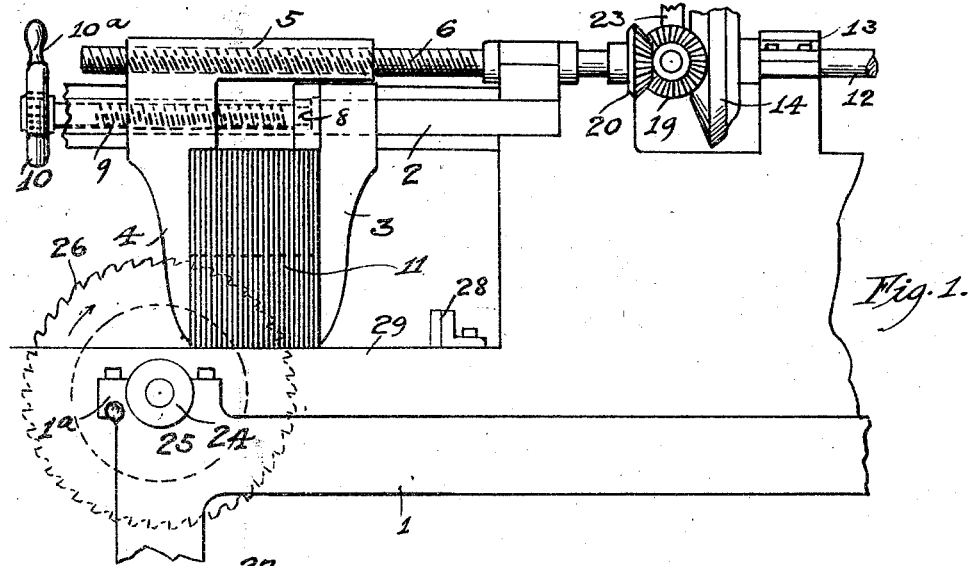
Fig. 1 is a fragmentary side elevation of the invention with parts broken away.
Figure 2:
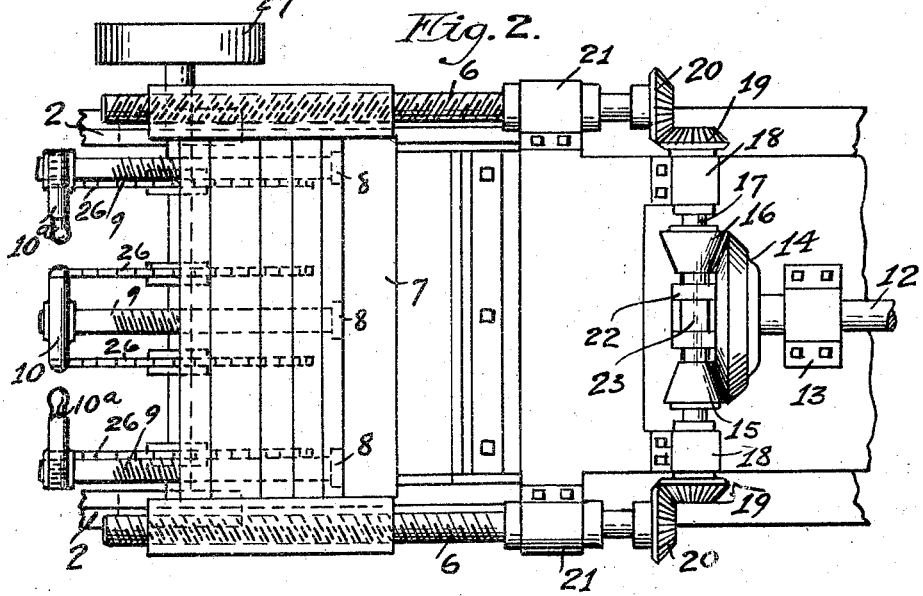
Fig. 2 is a plan elevation of the machine shown in Fig. 1.
Figure 3:
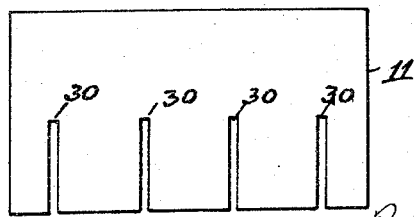
Fig. 3 is a detail of one of the completed shingle elements.

Referring to the drawings, upon the frame members 1 are mounted two ways 2, which carry the gripping jaws 3 and 4. These jaws slide along the ways 2, the outer jaws 4 having elongated sleeve nuts 5 on their upper portion, which are internally cross threaded. Into these sleeve nuts feed the driving screws 6 which are likewise cross threaded and adapted to feed the jaws forward or back upon the ways. The inner jaws 3 are connected by a tie beam 7.

Threaded through the outer jaws and fastened by means of a pivoted socket 8 in the tie beam 7 are the holding screws 9. On the outer end of the holding screws are a hand wheel 10 and ratchet levers $10^a$, which furnish a means of operating the holding screws which cause the inner jaws to be fed toward or away from the outer jaws. By means of these screws, the bundle of shingles or shingle strips shown at 11 are firmly gripped between the two gripping members 3 and 4. For the purpose of driving the gripping members back and forth upon the feeding screws 6, power from any suitable source is supplied through the propeller shaft 12. This propeller shaft is mounted in suitable bearings 13 and has fixed a bevelled friction disk 14 at its end. This friction disk is adapted to contact the bevelled friction disks 15 and 16, slidably mounted upon a shaft 17. This shaft is mounted in bearings 18 and has at either end bevel gears 19. These bevel gears mesh with similar gears 20 mounted on the ends of the feed screws 6. The feed screws are supported by suitable bearings 21 which are fastened to the frame member 1. The direction of the feed is controlled by means of a clutch arrangement 22, which is situated between the friction disks 15 and 16. By manipulating the shifter 23, the disks 15 or 16 may be made to contact with the disk 14. When the disk 15 is in contact with the disk 14, the shaft 17 will be driven through this disk and the screws 6 will rotate, causing the jaws to feed in one direction while the disk 16 will be running out of contact with the disk 14. If the shifter is moved to the opposite side and the disk 16 is made to contact with the disk 14, the motion of the shaft 17 will be reversed and the screws will feed the jaws in an opposite direction. By combining this reversible feed with right and left hand threaded driving screws 6, it is possible to feed the shingles which are gripped between the jaws outwardly or inwardly as desired.

The frame member 1 is shaped at $1^a$ to support the bearing 24 in which is mounted a shaft 25. Upon this shaft at regular intervals are keyed the circular cutters 26. These cutters are rotated through the pulley 27 by power from any suitable source.

After a bundle of shingles has been placed between the jaws and the jaws tightened by means of the holding screws to grip the shingles firmly, the jaws with the shingles therein are fed towards the circular cutters and slots produced in the shingles. The purpose of these slots 30 is to add to the ornamental effect of the shingle when laid upon the roof and by this method of cutting, the slots produced by the cutters are of uniform depth and the edges of the slots are clean cut, due to the fact that the cutters operate upon the bundle of shingles as a unit instead of tearing away the material as it would in cutting slots in a single shingle. A stop 28 is mounted on the table portion 29 of the frame 1, and stops the inward feed of the gripping jaws.

The operation of cutting the slots is performed while the bundle of shingles held in the gripping jaws is being fed in an outward direction, the inward or return feed being merely to return the jaws into position for placing another bundle of blank shingles therein.

I claim as my invention:

1. An apparatus for slotting prepared roofing strips, comprising a base, of a pair of adjustable jaws supported on said base, and threaded members for adjusting said jaws to clamp therebetween a bundle of roofing strip shingles, one of said jaws having an overlying extension provided with a threaded aperture passing therethrough, a threaded operating shaft cooperating with said aperture, means for rotating said shaft to move both of the jaws as a unit, and a rotating cutter in the path of movement of said jaws for cutting slots in said bundle of shingles carried thereby.

2. An apparatus of the character described, comprising a base, of guideways thereon, of a pair of jaws seated on said guideways, one of said jaws having a forwardly extending part overlying the upper edge of the other jaw, means for adjusting said jaws relative to each other to clamp a bundle of shingles therebetween, means for shifting the jaws as a unit with the shingles comprising an operating element cooperating with the forwardly extending part of one jaw, means for actuating said element, and a rotating cutter disposed within the path of movement of the shingle strip to cut slits in said strip.

ROBERT T. POLLOCK.